(12) United States Patent
Ihori

(10) Patent No.: US 9,643,556 B2
(45) Date of Patent: May 9, 2017

(54) VEHICLE FRONT STRUCTURE

(71) Applicant: TOYOTA JIDOSHA KABUSHIKI KAISHA, Toyota-shi, Aichi-ken (JP)

(72) Inventor: Shinichiro Ihori, Toki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/025,720

(22) PCT Filed: Oct. 9, 2014

(86) PCT No.: PCT/IB2014/002061
§ 371 (c)(1),
(2) Date: Mar. 29, 2016

(87) PCT Pub. No.: WO2015/059534
PCT Pub. Date: Apr. 30, 2015

(65) Prior Publication Data
US 2016/0244014 A1    Aug. 25, 2016

(30) Foreign Application Priority Data
Oct. 21, 2013 (JP) .................................. 2013-218558

(51) Int. Cl.
*B60R 19/52* (2006.01)
*B62D 25/08* (2006.01)

(52) U.S. Cl.
CPC ............ *B60R 19/52* (2013.01); *B62D 25/084* (2013.01)

(58) Field of Classification Search
CPC ............................... B60R 19/52; B62D 25/084

USPC .......................... 296/193.09, 187.09, 203.02
See application file for complete search history.

(56) References Cited

U.S. PATENT DOCUMENTS

| | | | | |
|---|---|---|---|---|
| 7,044,536 B2 * | 5/2006 | Uchiyama | ............ | B62D 25/084 296/187.09 |
| 7,287,613 B2 * | 10/2007 | Kim | ...................... | B62D 25/084 180/68.4 |
| 7,331,413 B2 * | 2/2008 | Okai | ..................... | B62D 25/084 180/68.1 |
| 8,007,035 B2 * | 8/2011 | Jyo | ...................... | B62D 25/084 293/115 |
| 8,646,554 B2 * | 2/2014 | Takahashi | ............ | B62D 25/084 165/67 |
| 2002/0060476 A1 * | 5/2002 | Cantineau | ............ | B62D 25/084 296/193.09 |

(Continued)

FOREIGN PATENT DOCUMENTS

| | | | |
|---|---|---|---|
| JP | 2002-166848 A | 6/2002 | |
| JP | 2003-034265 A | 2/2003 | |

(Continued)

*Primary Examiner* — Jason S Morrow
*Assistant Examiner* — E Turner Hicks
(74) *Attorney, Agent, or Firm* — Oliff PLC

(57) ABSTRACT

A vehicle front structure is configured such that an absorber is provided on a front surface of a center brace that connects in a vehicle up and down direction a radiator support upper to a radiator support lower. Accordingly, when a load is input from a front side of a vehicle, a load transfer passage through the absorber, the center brace, and the radiator support upper or the radiator support lower is newly configured, thereby improving impact absorption performance.

2 Claims, 5 Drawing Sheets

(56) References Cited

U.S. PATENT DOCUMENTS

| 2002/0070062 | A1* | 6/2002 | Joutaki | ............... | B62D 25/084 |
| | | | | | 180/68.4 |
| 2010/0163324 | A1* | 7/2010 | Jyoutaki | .............. | B62D 25/084 |
| | | | | | 180/68.1 |

FOREIGN PATENT DOCUMENTS

| JP | 2005-178682 A | 7/2005 |
| JP | 2007-331452 A | 12/2007 |

* cited by examiner

VEHICLE FRONT STRUCTURE

BACKGROUND OF THE INVENTION

1. Field of the Invention

The present invention relates to a vehicle front structure.

2. Description of Related Art

In a vehicle front structure for an automobile, a radiator support lower and a radiator support upper that extend in a vehicle width direction are connected to each other by a center brace provided on their front sides in a vehicle front-rear direction so as to extend in a vehicle up and down direction.

The vehicle front structure for an automobile is provided so as to improve impact absorption performance, and it is conceivable that the radiator support upper, the center brace, and the like are used for impact absorption in a proactive manner.

In that case, since a hood lock is placed between, the radiator support upper and the center brace, a problem with load transfer may be caused.

Note that Japanese Patent Application Publication No. 2002-166848 (JP 2002-166848 A) describes a structure in which a center brace is fastened to a radiator support upper in a position deviating from a hood lock, more specifically, in positions on both sides of the hood lock in a vehicle width direction.

However, in order to improve the impact absorption performance of the vehicle, it is required that the radiator support upper and the like are used as a load transfer passage still more effectively.

SUMMARY OF THE INVENTION

The present invention provides a vehicle front structure in which impact absorption performance is improved still more.

A vehicle front structure according to one aspect of the present invention includes: a radiator support upper extending in a vehicle width direction; a radiator support lower provided on a lower side relative to the radiator support upper in a vehicle up and down direction, the radiator support lower extending in the vehicle width direction; a center brace disposed on a front side of the radiator support upper in a vehicle front-rear direction, the center brace disposed on a front side of the radiator support lower in a vehicle front-rear direction, the center brace connecting the radiator support upper to the radiator support lower in the vehicle up and down direction; and a load receiving member placed on a front side of the center brace in the vehicle front-rear direction, the load receiving member extending in the vehicle width direction.

In the vehicle front structure, when a load is input from a front side in the vehicle front-rear direction, the load thus input is transmitted to the radiator support upper and the radiator support lower via the load receiving member placed on the front side of the center brace in the vehicle front-rear direction and the center brace. Since a load transfer passage that is not provided in a vehicle of a related art is configured as such, impact absorption performance is improved.

Note that the "placement" of the load receiving member includes a case where the load receiving member is directly attached to the center brace, a case where the load receiving member abuts with the center brace, and a case where the load receiving member is placed in front of the center brace at a slight interval.

The vehicle front structure may further include a hood lock attached to the front side of the radiator support upper in the vehicle front-rear direction, and the center brace may, be connected to the radiator support upper on at least one side of the hood lock in the vehicle width direction.

In the vehicle front structure, the center brace is directly connected to the radiator support upper, on at least one side of the hood lock in the vehicle width direction, not via the hood lock attached to the front side of the radiator support upper in the vehicle front-rear direction. Accordingly, at least part of the load input into the center brace from the load receiving member is directly transmitted from the center brace to the radiator support upper. This accordingly reduces the load to be transmitted from the center brace to the hood lock, thereby preventing deformation of the hood lock due to the load input.

In the vehicle front structure, the center brace may be connected to the radiator support upper on both sides of the hood lock in the vehicle width direction.

In the vehicle front structure, since the center brace is connected to the radiator support upper on both sides of the hood lock in the vehicle width direction, a percentage of the load directly transmitted from the center brace to the radiator support upper increases. As a result, the load to be transmitted from the center brace to the hood lock is reduced still more, thereby further surely preventing the deformation of the hood lock along with the load input.

In the vehicle front structure, the load receiving member may include a vulnerable portion, the vulnerable portion being deformed when a load is input in the vulnerable portion from a front side of the load receiving member in the vehicle front-rear direction.

In the vehicle front structure, since the load receiving member placed on the front side of the center brace in the vehicle front-rear direction includes the vulnerable portion, when a load is input from the front side in the vehicle front-rear direction, the vulnerable portion is deformed to absorb an impact. That is, it is possible to still more improve the impact absorption performance.

Particularly, when the center brace is directly connected to the radiator support upper, it is possible to prevent the center brace from being deformed first at the time when a load is input and to prevent the hood lock from being deformed, thereby making it possible to surely deform the vulnerable portion.

According to the aspect of the present invention, it is possible to still more improve the impact absorption performance of the vehicle front structure.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

A vehicle front structure according to an embodiment of the present invention is described below.

Figure 1:
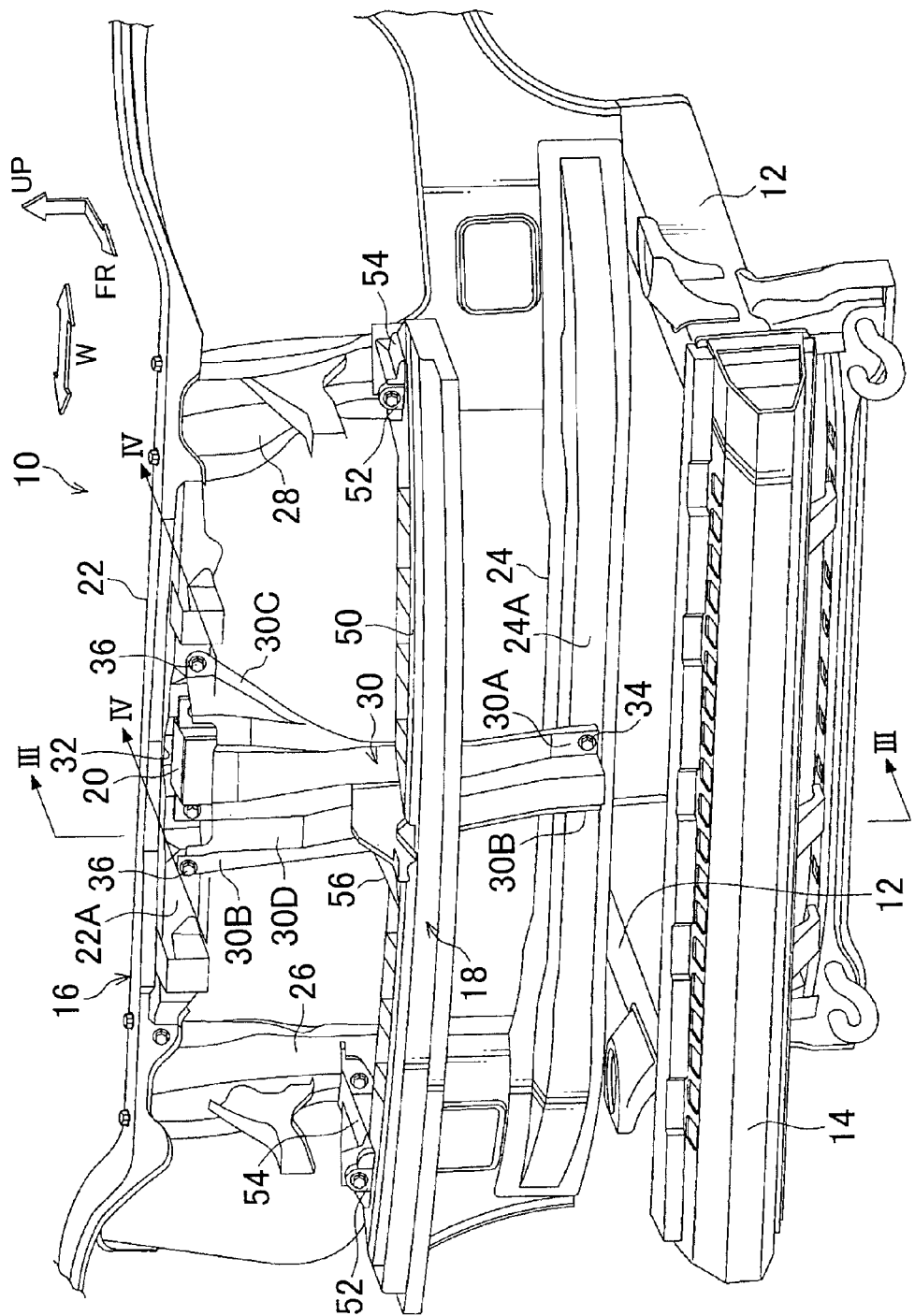
FIG. 1 is a perspective view illustrating a vehicle front structure according to an embodiment of the present invention.
Figure 2:
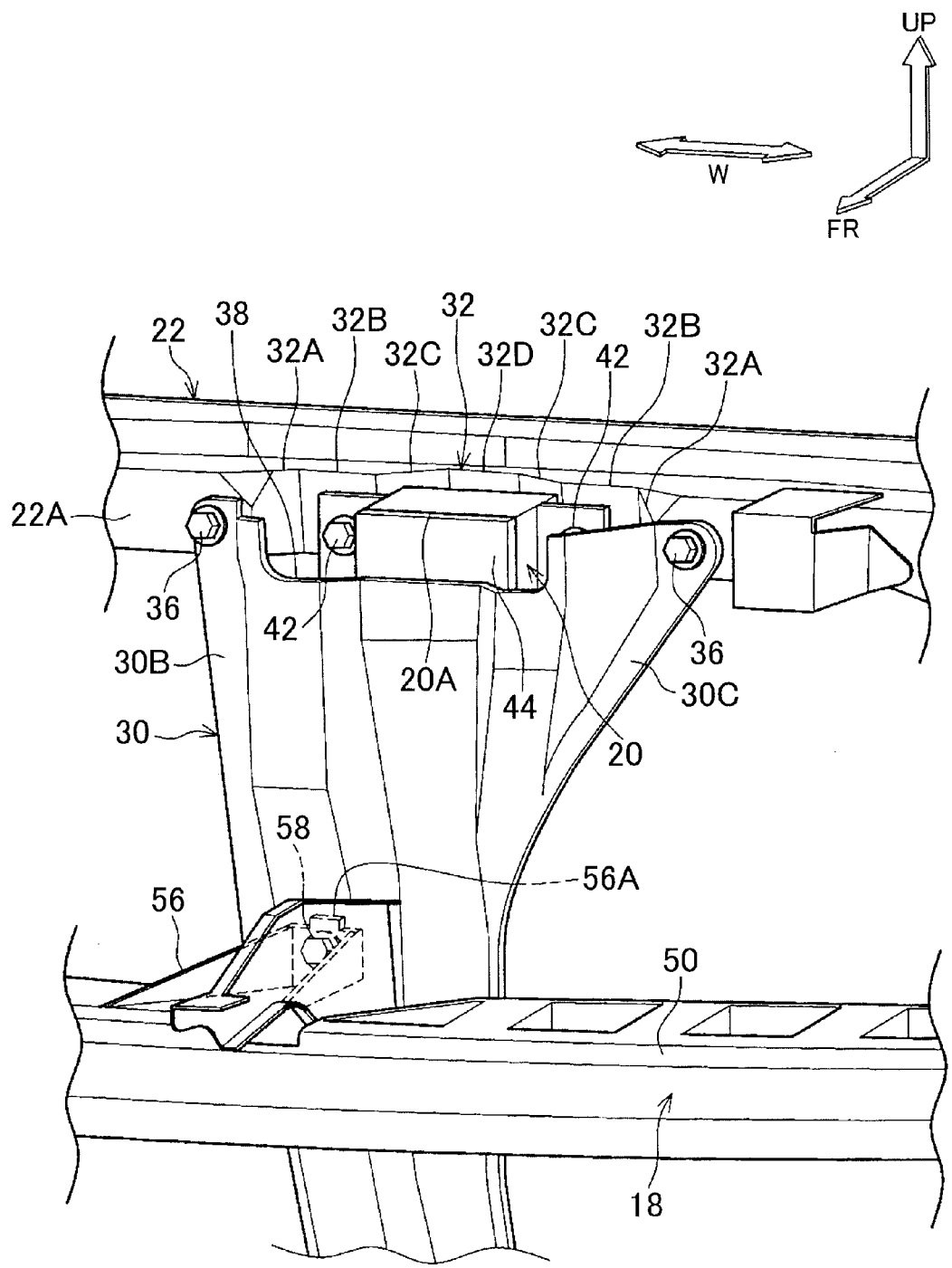
FIG. 2 is an enlarged perspective view of an essential part of the vehicle front structure according to the embodiment of the present invention.
Figure 3:
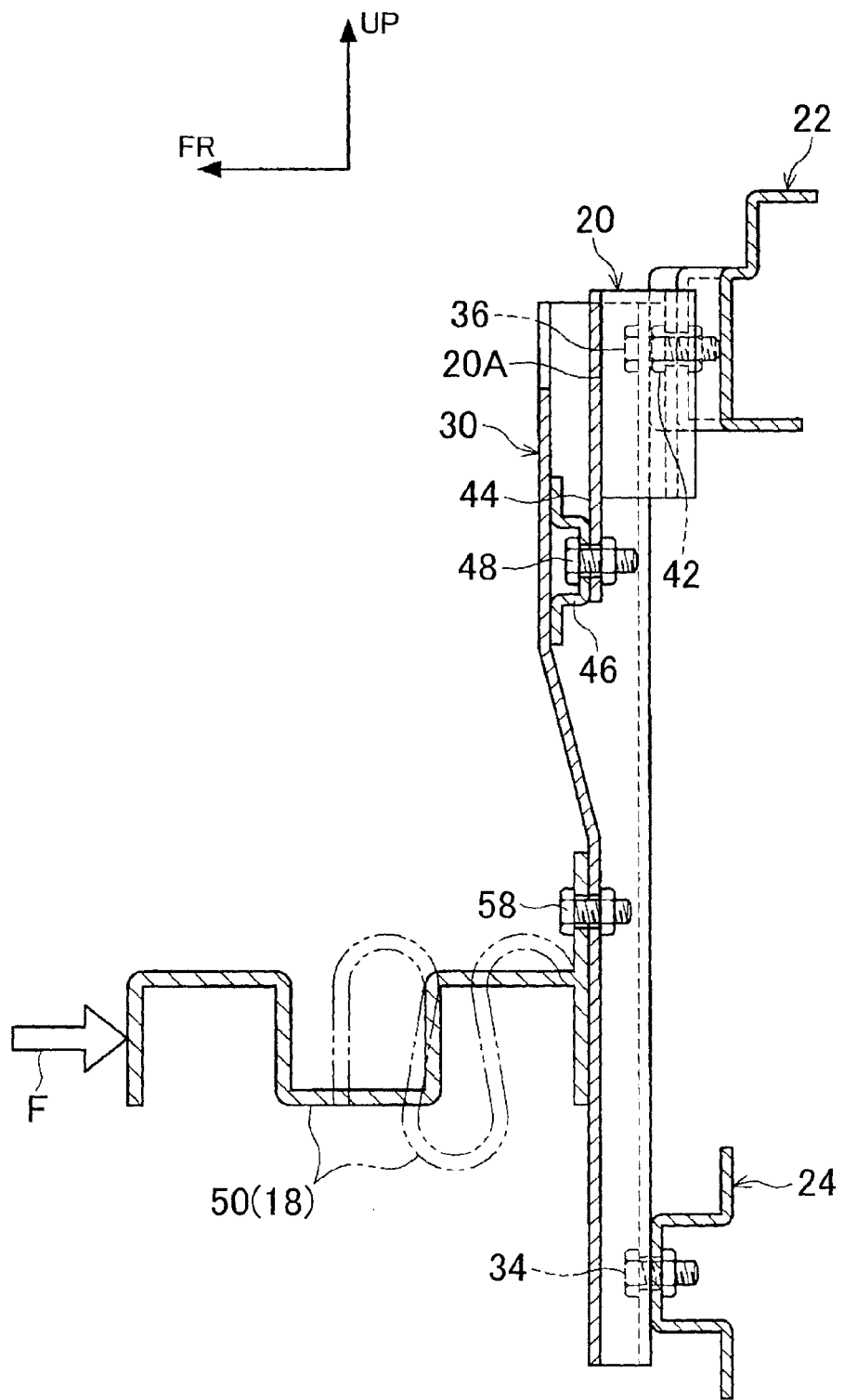
FIG. 3 is a sectional view taken along a line III-III in FIG. 1.
Figure 4:
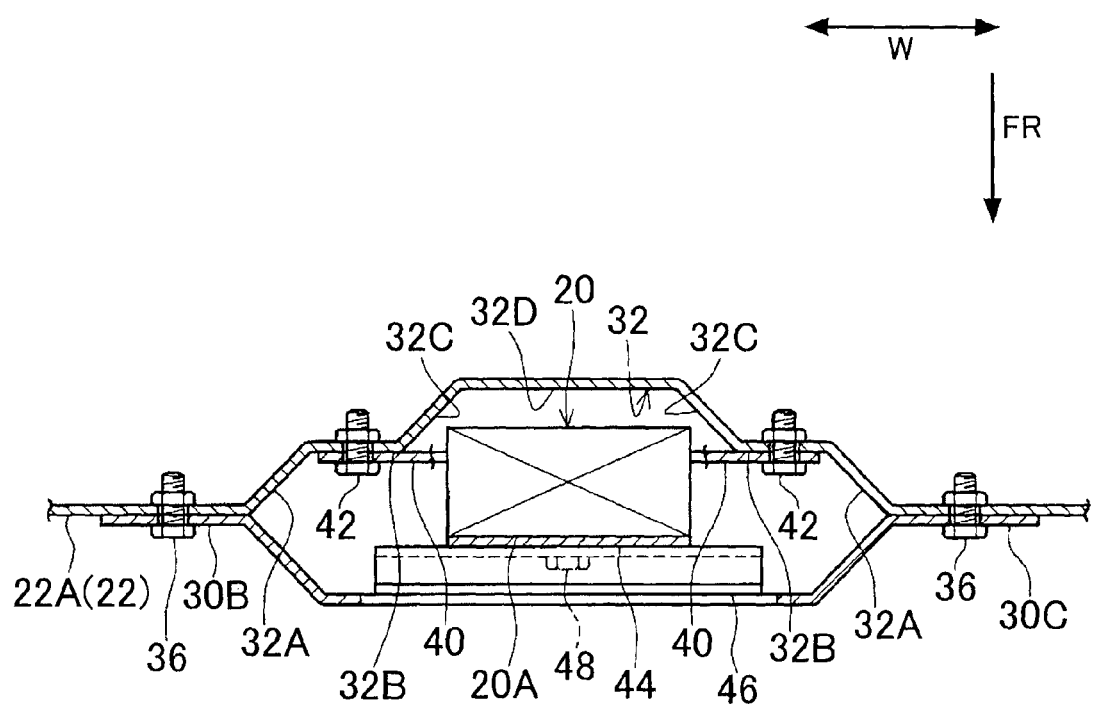
FIG. 4 is a sectional view taken along a line IV-IV in FIG. 1.
Figure 5A:
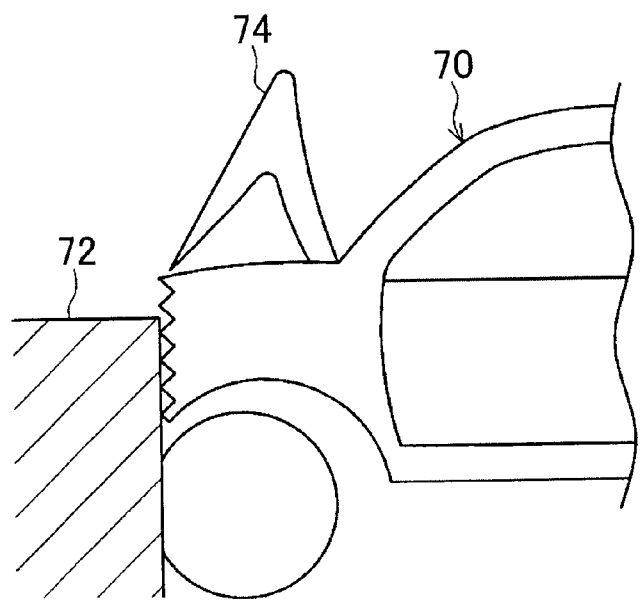
FIG. 5A is an effect explanatory view of the embodiment of the present invention and a comparative example.
Figure 5B:
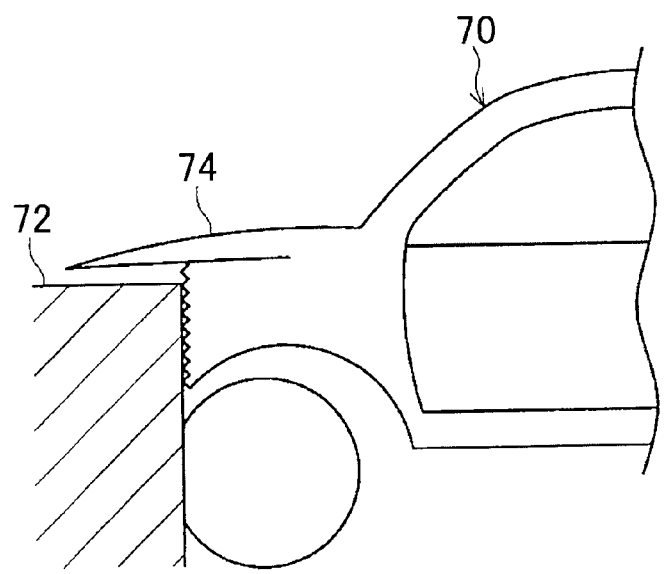
FIG. 5B is an effect explanatory view of the embodiment of the present invention and the comparative example.

FIG. 1 is a perspective view of a vehicle front structure 10, FIG. 2 is an enlarged perspective view of an essential part of the vehicle front structure, FIG. 3 and FIG. 4 are respectively a sectional view taken along a line in FIG. 1 and a sectional view taken along a line IV-IV in FIG. 1, and FIGS. 5A, 5B are effect explanatory views. Note that FIG. 3 and FIG. 4 briefly (schematically) illustrate shapes of some parts for the convenience of the description. In each drawing, a vehicle width direction is indicated by an arrow W, an upper side in a vehicle up and down direction (hereinafter also referred to as a vehicle upper side) is indicated by an arrow UP, and a front side in a vehicle front-rear direction (hereinafter also referred to as a vehicle front side) is indicated by an arrow FR.

An outline of the vehicle front structure is described first, and then, a structure of an essential part thereof is described in detail.

As illustrated in FIG. 1, the vehicle front structure 10 includes: a pair of front side members 12 extending in parallel to each other in the vehicle front-rear direction; a lower absorber 14 attached to vehicle front ends of the pair of front side members 12 and extending in the vehicle width direction; a radiator support 16 disposed slightly on a rear side in the vehicle front-rear direction (hereinafter also referred to as a vehicle rear side) relative to the lower absorber 14 and above the front side members 12; an absorber 18 attached to a vehicle front side of the radiator support 16; and a hood lock 20 mounted on the radiator support 16. Note that the absorber 18 corresponds to the "load receiving member" of the present invention.

The radiator support 16 includes: a radiator support upper 22 extending in the vehicle width direction; a radiator support lower 24 extending in the vehicle width direction below the radiator support upper 22; pillars 26, 28 connecting in the vehicle up and down direction both ends of the radiator support upper 22 to both ends of the radiator support lower 24; and a center brace 30 connecting in the vehicle up and down direction a central part of the radiator support upper 22 in the vehicle width direction to a central part of the radiator support lower 24 in the vehicle width direction.

In the vehicle front structure 10 configured as such, a mounting structure of an essential part thereof, i.e., the radiator support 16, the absorber 18, and the hood lock 20, is described in detail.

The radiator support upper 22 and the radiator support lower 24 of the radiator support 16 have a generally hat-like section that is opened toward the vehicle rear side, and their vehicle rear sides are fastened to the pillars 26, 28 extending in the vehicle up and down direction.

Note that the radiator support upper 22 includes a top face 22A formed so as to project toward the vehicle front side and to extend in the vehicle width direction. Further, the central part of the radiator support upper 22 (the top face 22A) in the vehicle width direction is provided with a recessed portion 32 on which the hood lock 20 is mounted. As illustrated in FIGS. 2 and 4, the recessed portion 32 includes: mounting surfaces 32B, 32B provided so as to go down a step, via inclined surfaces 32A, 32A, from that top face 22A of the radiator support upper 22 which is formed so as to project toward the vehicle front side, so that the mounting surfaces 32B, 32B are placed on the vehicle rear side relative to the top face 22A; and a bottom face 32D provided so as to further go down a step, via inclined surfaces 32C, 32C, from the mounting surfaces 32B, 32B so that the bottom face 32D is placed on the vehicle rear side relative to the mounting surfaces 32B, 32B.

In the meantime, the center brace 30 is a member having a generally hat-like section that is opened on its vehicle rear side, and is attached to vehicle front sides of the radiator support upper 22 and the radiator support lower 24. More specifically, as illustrated in FIG. 1, flange portions 30A, 30B of a bottom end side of the center brace 30 are fastened to that top face 24A of the radiator support lower 24 which is formed so as to project toward the vehicle front side, via fastening portions (portions fastened with a bolt and a nut; the same shall apply hereinafter) 34, 34 (one of them is not illustrated herein).

Further, in order to prevent interference with the hood lock 20 to be described, later, an upper end side of the center brace 30 is broader in the vehicle width direction than the bottom end side thereof, and flange portions 30B, 30C on both ends in the vehicle width direction are fastened, via fastening portions 36, 36, to the top face 22A of the radiator support upper 22 on both sides of the recessed portion 32 (the hood lock 20) of the radiator support upper 22 in the vehicle width direction. Further, the center brace 30 has a notch portion 38 formed by cutting an upper end of the center brace 30 toward a lower side in the vehicle up and down direction (hereinafter also referred to as a vehicle lower side), so as to restrain a contact amount with the hood lock 20.

As illustrated in FIGS. 2 and 4, the hood lock 20 mounted on the radiator support upper 22 is generally rectangular, and a pair of plate-shaped mounting flanges 40, 40 provided on both sides thereof in the vehicle width direction are fastened, via fastening portions 42, 42, to the mounting surfaces 32B, 32B of the recessed portion 32 of the radiator support upper 22. Further, as illustrated in FIG. 3, the top face 20A on the vehicle front side of the rectangular hood lock 20 is provided with a mounting flange 44 extending toward the vehicle lower side. The mounting flange 44 is fastened, via a fastening portion 48, to a mounting member 46 having a generally hat-like section and fixed to a vehicle rear side of the center brace 30.

The absorber 18 attached to a vehicle front side of the center brace 30 includes a resin EA material 50 serving as an impact absorber and having a crank-shaped section. The absorber 18 has a structure in which, when a load is input from the vehicle front side, the sectional shape of the EA material 50 is deformed so as to absorb an impact (see an alternate long and two short dashes line portion in FIG. 3). Note that the EA material 50 corresponds to the "vulnerable portion" of the present invention.

Further, as illustrated in FIG. 1, both ends of the absorber 18 in the vehicle width direction are fastened to the pillars 26, 28 via mounting flanges 52, 52 provided toward the upper side in the vehicle up and down direction, and via mounting members 54, 54 fastened to the mounting flanges 52, 52.

Further, as illustrated in FIG. 2, the absorber 18 is provided with a generally U-shaped mounting flange 56 formed on a top face of a central part thereof in the vehicle width direction so as to project toward the vehicle rear side, and a bottom portion 56A of the mounting flange 56 is fastened, via a fastening portion 58, to that top face 30D of the center brace 30 which is formed so as to project toward the vehicle front side. As such, the absorber 18 is fixed to the vehicle front sides of the pillars 26, 28 and the center brace 30.

An effect of the vehicle front structure 10 thus configured is described below.

When a load is input from the vehicle front side, the load is input not only from the lower absorber 14 as in the related art, but the load is also input from the absorber 18. The load thus input into the absorber 18 is transmitted to the pillars 26, 28 and the center brace 30 to which the absorber 18 is fastened.

Further, the load is transmitted to the radiator support upper 22 from the flange portions 30B, 30C of the center brace 30 via the fastening portions 36, 36, and further via the mounting member 46 of the center brace 30, the fastening portion 48, the hood lock 20, and the fastening portion 42. Further, the load is transmitted to the radiator support lower 24 from the flanges 30A, 30B of the center brace 30 via the fastening portions 34, 34.

When the absorber 18 is placed on the vehicle front side of the center brace 30 that is not provided in the related art, a load transfer passage through the absorber 18, the center brace 30, and the radiator support upper 22 or the radiator support lower 24 is configured.

Further, the flange portions 30B, 30C of the center brace 30 are fastened, via the fastening portions 36, 36, to the radiator support upper 22 on both sides of the hood lock 20 (the recessed portion 32) in the vehicle width direction. That is, since the center brace 30 is fastened directly to the radiator support upper 22, attachment rigidity is improved.

This accordingly makes it possible to prevent such a problem that the upper end side of the center brace 30 is bent before the EA material 50 of the absorber 18 is deformed due to the input of a load from the vehicle front side, and the EA material 50 of the absorber 18 is not deformed.

As a result, it is possible to surely deform the EA material 50 of the absorber 18 at the time when the load is input (see a broken line portion in FIG. 3). That is, it is possible to surely demonstrate impact absorption performance of the absorber 18 (the EA material 50).

Further, since the load is directly transmitted to the radiator support upper 22 from the center brace 30 via the fastening portions 36, 36, it is possible to reduce the load to be transmitted from the center brace 30 to the hood lock 20 via the mounting member 46. As a result, it is possible to prevent the hood lock 20 from being deformed due to the input of the load.

Accordingly, it is possible to prevent the following problem: that is, as illustrated in FIG. 5B, for example, when a vehicle 70 having the vehicle front structure 10 has a front end collision with another vehicle 72 during high-speed running, the hood lock 20 is deformed due to a load input from the absorber 18 to the hood lock 20 via the center brace 30, so that an impact from the counterpart vehicle 72 cannot be absorbed by deformation of an engine hood 74. That is, as illustrated in FIG. 5A, even when the vehicle 70 has a front end collision with the vehicle 72 having a vehicle height lower than the vehicle 70, it is possible to prevent the hood lock 20 from being deformed due to an impact load input from the absorber 18, thereby making it possible to surely deform the engine hood 74 and to surely absorb an impact due to the collision.

Accordingly, even in a case where such a new, load transfer passage through the absorber 18, the center brace 30, and the radiator support upper 22 is configured like the vehicle front structure 10 of the present embodiment, it is possible to prevent the deformation of the hood lock 20 due to the input of the load. As a result, it is not necessary to manufacture a new hood lock that is improved in strength in comparison with the hood lock 20 of the related art. That is, in the vehicle front structure 10, it is possible to improve the impact absorption performance while preventing the deformation of the hood lock 20 along with the load input, with the use of the hood lock 20 of the related art.

Note that, in the present embodiment, the absorber 18 including the EA material 50 is placed on the front side of the center brace 30 in the vehicle front-rear direction. However, the present invention is not limited to this. That is, a member having other purposes corresponds to the "load receiving member" of the present invention, provided that the member has a function to transmit a load to the center brace 30 and the radiator support upper 22.

Further, in the present embodiment, the upper end of the center brace 30 is fastened to the top face 22A of the radiator support upper 22 on both sides of the hood lock 20 in the vehicle width direction. However, the upper end of the center brace 30 may be fastened to the top face 22A of the radiator support upper 22 only on one side of the hood lock 20 in the vehicle width direction. Even in this case, it is possible to reduce a load to be transmitted to the hood lock 20 and to prevent the deformation of the hood lock 20. Further, since one part of the center brace 30 is fastened to the radiator support upper 22 and another part of the center brace 30 is fastened to the radiator support upper 22 via the hood lock 20, it is possible to prevent the center brace 30 from being deformed first at the time when a load is input, thereby making it possible to surely deform the EA material 50 of the absorber 18.

Note that, in the present embodiment, the absorber 18 is fastened to the center brace 30 by fastening (the fastening portion) and the center brace 30 is fastened to the radiator support upper 22 by fastening (the fastening portion), but this is not meant to limit their connection methods to the fastening. Other connection methods are also usable.

Further, in the present embodiment, the absorber 18, which is the "load receiving member" of the present invention, extends between the pillars 26, 28 of the radiator support 16 in the vehicle width direction, but the present invention is not limited to this. That is, the absorber 18 may be shorter than the one exemplified herein provided that the absorber 18 extends in the vehicle width direction and is provided at least in front of the center brace 30.

Further, in the present embodiment, the absorber 18 is fastened to the center brace 30. However, the absorber 18 may abut with the center brace 30, or the absorber 18 may be placed on the vehicle front side of the center brace 30 at a slight interval. Even in that case, the effect of the present invention can be obtained.

Furthermore, one center brace 30 is provided in the present embodiment, but a plurality of center braces 30 may be provided. Further, in the present embodiment, the center brace 30 is placed in a center between the pillars 26, 28 in the vehicle width direction, but may be placed on the right side or the left side in an offset manner. Accordingly, the present invention also includes such a configuration that two center braces 30 are placed in respective positions offset toward right and left from the center in the vehicle width direction.

Furthermore, in the present embodiment, the EA material 50 is made of resin, but may be made of metal such as iron or aluminum.

The invention claimed is:

1. A vehicle front structure comprising:

a radiator support upper extending in a vehicle width direction;

a radiator support lower provided on a lower side relative to the radiator support upper in a vehicle up and down direction, the radiator support lower extending in the vehicle width direction;

a center brace disposed on a front side of the radiator support upper in a vehicle front-rear direction, the center brace disposed on a front side of the radiator support lower in the vehicle front-rear direction, the center brace connecting the radiator support upper to the radiator support lower in the vehicle up and down direction; and a load receiving member placed on a front side of the center brace in the vehicle front-rear direction, the load receiving member extending in the vehicle width direction, wherein the center brace is connected to the radiator support upper on both sides of a hood lock in the vehicle width direction, the hood lock is attached to the front side of the radiator support upper in the vehicle front-rear direction, and the center brace is connected to the radiator support upper not via the hood lock, the load receiving member includes a vulnerable portion, the vulnerable portion configured to be deformed before the center brace, the radiator support upper and radiator support lower, when a load is input in the vulnerable portion from a front side of the load receiving member in the vehicle front-rear direction.

2. The vehicle front structure according to claim 1, wherein the vulnerable portion includes a resin material having a crank-shaped section.

* * * * *